US012004694B2

(12) United States Patent
Chung

(10) Patent No.: US 12,004,694 B2
(45) Date of Patent: Jun. 11, 2024

(54) TOILET SEAT LIFT ASSEMBLY

(71) Applicant: Kohler Co., Kohler, WI (US)

(72) Inventor: Chanseol Chung, Milwaukee, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/132,529

(22) Filed: Apr. 10, 2023

(65) Prior Publication Data

US 2023/0277018 A1 Sep. 7, 2023

Related U.S. Application Data

(63) Continuation of application No. 17/854,344, filed on Jun. 30, 2022, now Pat. No. 11,647,877, which is a continuation of application No. 17/221,490, filed on Apr. 2, 2021, now Pat. No. 11,419,463.

(60) Provisional application No. 63/004,584, filed on Apr. 3, 2020.

(51) Int. Cl.
*A47K 13/10* (2006.01)
*A61G 7/10* (2006.01)

(52) U.S. Cl.
CPC ............ *A47K 13/10* (2013.01); *A61G 7/1007* (2013.01)

(58) Field of Classification Search
CPC ......... A47K 13/10; A61G 7/1007; A61G 5/14
See application file for complete search history.

(56) References Cited

U.S. PATENT DOCUMENTS

| | | | |
|---|---|---|---|
| 3,458,872 | A | 8/1969 | Hellstrom et al. |
| 3,473,174 | A | 10/1969 | Cool |
| 3,479,087 | A | 11/1969 | Burke |
| 3,623,767 | A | 11/1971 | Condon |
| 3,925,833 | A | 12/1975 | Hunter |
| 4,091,473 | A | 5/1978 | Matthews et al. |
| 4,168,552 | A | 9/1979 | Austin |
| 4,185,335 | A | 1/1980 | Alvis |
| 4,399,572 | A | 8/1983 | Johansson |
| 4,581,778 | A | 4/1986 | Pontoppidan |
| 4,587,678 | A | 5/1986 | Love et al. |
| 4,777,671 | A | 10/1988 | Kearns |
| 4,833,736 | A | 5/1989 | Sadler et al. |
| 4,872,223 | A | 10/1989 | Baird |
| 4,884,841 | A | 12/1989 | Holley |

(Continued)

FOREIGN PATENT DOCUMENTS

| | | | |
|---|---|---|---|
| WO | 1989008437 | A1 | 9/1989 |
| WO | 1993011692 | A1 | 6/1993 |

(Continued)

OTHER PUBLICATIONS

PCT International Search Report and Written Opinion of International Searching Authority, corresponding to PCT International Application No. PCT/US21/257108 dated Jul. 9, 2021.

*Primary Examiner* — Christine J Skubinna

(74) *Attorney, Agent, or Firm* — Lempia Summerfield Katz LLC

(57) ABSTRACT

In one example, a lifting assembly for a toilet includes at least a track arm and a track. The track arm is configured to guide a toilet seat assembly from a first position to a second position. The track is coupled to a base enclosure of the toilet and providing a track path for the track arm, and the track path has a radius of curvature to limit the range of motion of the toilet seat assembly.

18 Claims, 12 Drawing Sheets

(56) References Cited

U.S. PATENT DOCUMENTS 4,993,085 A 2/1991 Gibbons
5,027,446 A 7/1991 Robertson
5,063,617 A 11/1991 Ward et al.
5,142,709 A 9/1992 Mcguire
5,155,873 A 10/1992 Bridges
5,189,739 A 3/1993 Thierry
5,309,583 A 5/1994 White et al.
5,323,497 A * 6/1994 Lih ........................ A47K 13/10
297/DIG. 10
5,440,767 A 8/1995 Bergenwall
5,498,064 A 3/1996 Hooker et al.
5,513,867 A 5/1996 Bloswick et al.
5,561,872 A 10/1996 Phillips
5,588,162 A 12/1996 Robinson
5,592,703 A 1/1997 Jones et al.
5,626,389 A 5/1997 Logan, Jr.
5,661,858 A 9/1997 House et al.
5,737,780 A 4/1998 Okita et al.
5,819,325 A 10/1998 Richards
5,848,447 A 12/1998 Lindsay
5,884,935 A 3/1999 Tholkes
5,898,953 A 5/1999 Paxon
5,996,133 A 12/1999 Fletcher
6,003,171 A 12/1999 Jones, Jr.
6,035,462 A 3/2000 Bennett et al.
6,067,674 A 5/2000 Moser
6,098,215 A 8/2000 Goodwin
6,154,896 A 12/2000 Houston et al.
6,161,229 A 12/2000 Ryan et al.
6,189,164 B1 2/2001 Krapu
6,199,228 B1 3/2001 Kallweit
6,360,382 B1 3/2002 Karash
6,385,797 B1 5/2002 Phillips
6,438,769 B1 8/2002 Luckenbill
6,449,783 B1 9/2002 Moser
6,470,513 B1 10/2002 Cook
6,507,961 B1 1/2003 Ming-hwa
6,533,304 B2 3/2003 Lizama-troncoso et al.
6,540,250 B1 4/2003 Peterson
6,553,585 B1 4/2003 Lundstrom
6,598,246 B1 7/2003 Shou
6,622,320 B2 9/2003 Ward
6,643,866 B1 11/2003 Stewart
6,775,858 B1 8/2004 Miller
6,811,220 B2 11/2004 Shea et al.
6,851,751 B1 2/2005 Romero et al.
7,039,964 B2 5/2006 Cavanagh
7,051,383 B1 5/2006 Paz
7,600,815 B2 10/2009 Corcoran
7,900,297 B2 * 3/2011 Peng .................... A61G 7/1007
4/444
8,056,158 B2 11/2011 Henshaw et al.
8,272,081 B2 9/2012 Anderson, Jr. et al.
8,336,130 B1 12/2012 Cardenas
8,556,347 B2 10/2013 Chen et al.
8,636,317 B2 1/2014 Wu
8,646,123 B1 2/2014 Potvin
8,973,997 B2 3/2015 Green et al.
9,050,231 B2 6/2015 Masters
9,066,841 B2 6/2015 Mastropole
9,492,339 B2 11/2016 Leib
9,775,757 B1 10/2017 Borgman et al.
9,820,901 B2 11/2017 Brown et al.
10,219,659 B1 3/2019 Armstrong
2006/0042005 A1 3/2006 Johnson et al.
2006/0048296 A1 3/2006 Sutou et al.
2006/0207020 A1 9/2006 Huff
2007/0039097 A1 2/2007 Waldal
2007/0209111 A1 9/2007 Boger et al.
2010/0219668 A1 9/2010 Nelson et al.
2011/0162138 A1 7/2011 Anderson, Jr. et al.
2011/0302710 A1 12/2011 Grierson
2012/0126601 A1 5/2012 Smith
2013/0069407 A1 3/2013 Park et al.
2013/0232686 A1 9/2013 Schwartz et al.
2014/0230142 A1 8/2014 Baker et al.
2014/0338119 A1 11/2014 Henshaw et al.
2014/0346745 A1 11/2014 Ganel
2015/0182402 A1 7/2015 Nelson et al.
2015/0257956 A1 9/2015 Wang
2016/0143795 A1 5/2016 Schwartz et al.
2017/0258652 A1 9/2017 Latham
2019/0070052 A1 * 3/2019 Humbert .............. A47K 13/105
2019/0290519 A1 9/2019 Sjogren et al.
2020/0390296 A1 * 12/2020 Hall ....................... A47K 13/28
2021/0100411 A1 * 4/2021 Song ...................... A47K 13/10
2021/0212527 A1 * 7/2021 Choi ...................... A47K 13/10

FOREIGN PATENT DOCUMENTS

WO 1994006389 A1 3/1994
WO 1995011656 A1 5/1995
WO 2001087219 A1 11/2001
WO 2003086161 A1 10/2003
WO 2006025040 A1 3/2006
WO 2008009819 A2 1/2008
WO 2009149929 A1 12/2009
WO 2011089281 A1 7/2011
WO 2016034954 A1 3/2016
WO 2019199925 A1 10/2019

* cited by examiner

TOILET SEAT LIFT ASSEMBLY

This application is a continuation under 35 U.S.C § 120 and 37 C.F.R. § 1.53(b) of U.S. patent application Ser. No. 17/854,344 filed Jun. 30, 2022, which is a continuation of U.S. patent application Ser. No. 17/221,490 filed Apr. 2, 2021, which claims priority benefit of Provisional Application No. 63/004,584 filed Apr. 3, 2020, and each of which is hereby incorporated by reference in its entirety.

BACKGROUND

The present disclosure relates generally to plumbing fixtures and toilet assemblies. More specifically, the present disclosure relates to toilet assemblies including a lifting mechanism. Generally speaking, devices that lift toilet seats are used by individuals who have limited mobility and struggle to independently sit onto, and stand up from, a toilet.

SUMMARY

At least one embodiment relates to a toilet assembly including a toilet seat assembly, a base assembly configured to enclose a portion of the toilet assembly, and a lifting assembly coupled to the base assembly within an interior portion of the base assembly. The lifting assembly is configured to selectively pivot the toilet seat assembly about a virtual pivot point between a first position and a second position, so as to assist a person with standing from a seated position on the toilet seat assembly or sitting on the toilet seat assembly from a standing position.

Another embodiment relates to a lifting assembly configured to selectively pivot a toilet seat assembly about a virtual pivot point between a first position and a second position.

Another embodiment relates to a method of lifting a toilet seat including extending an extension rod with an actuator, raising a track arm relative to a track, and pivoting a toilet seat about a virtual pivot point.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
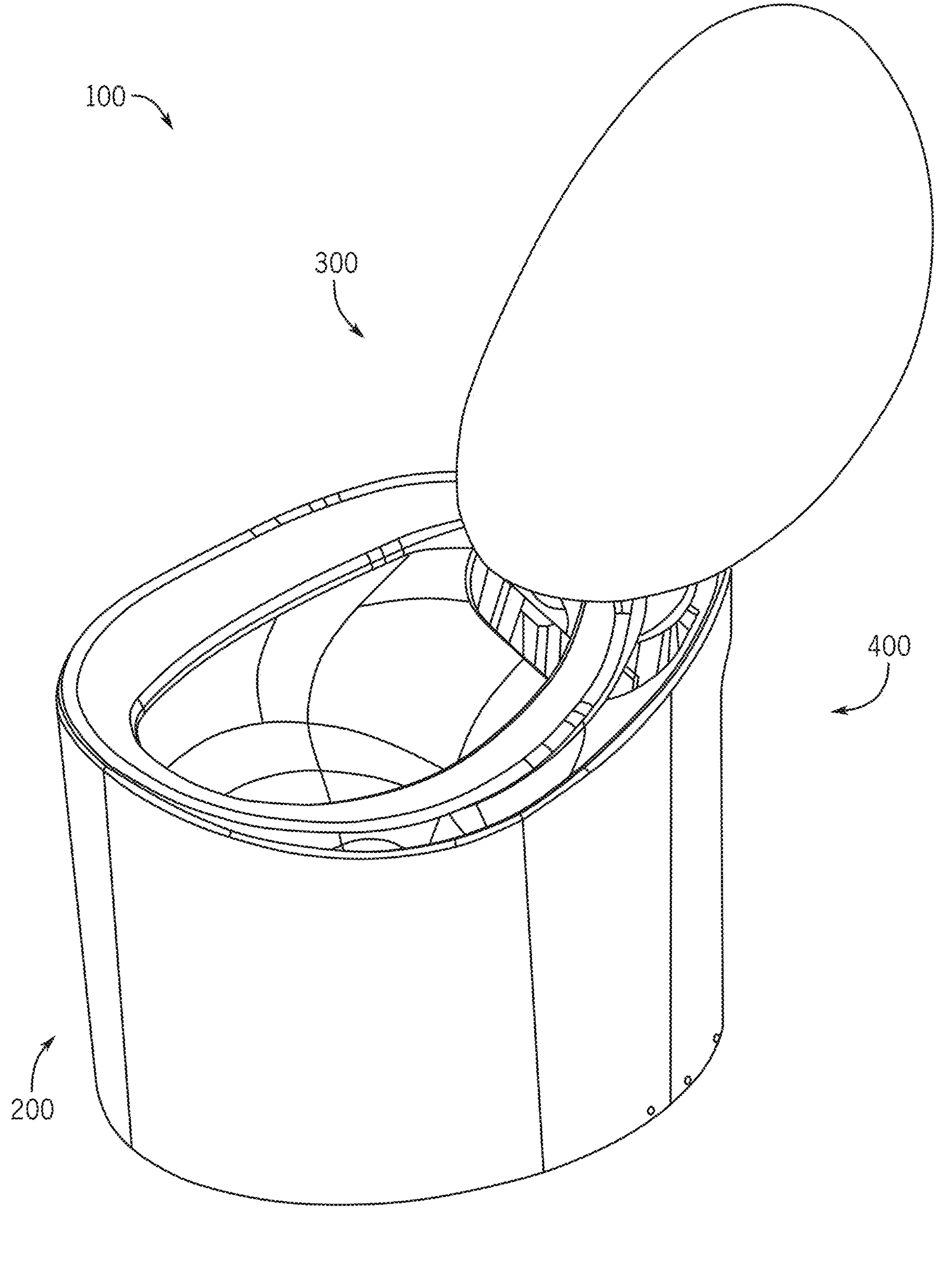
FIG. 1 is a perspective view of a toilet assembly according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "virtual pivot point" means a point which a member may pivot about without being physically secured (e.g., coupled, hinged, etc.) to the pivot point.

Generally speaking, most conventional devices that lift toilet seats are typically large attachments that attach externally to a toilet. Furthermore, conventional devices that lift toilet seats typically do not allow the toilet seat to maintain a constant pivot point without physically coupling the toilet seat/lid to the toilet base as the toilet seat is lifted, causing the toilet seat to go through a large range of motion.

Referring generally to the FIGURES, disclosed herein are various embodiments of a toilet assembly including a lifting assembly having a lifting mechanism configured to lift and pivot a toilet seat about a virtual pivot point. According to an exemplary embodiment, the lifting mechanism is pivotally coupled to the back of the toilet seat and the front of the toilet seat is free or uncoupled from the toilet base. The lifting mechanism is disposed within the toilet base, and is substantially concealed from view when in a lowered seat position. As the lifting mechanism extends or lifts in a generally upward direction, the back of the toilet seat raises, and the front of the toilet seat pivots about a constant virtual pivot point. The lifting assembly includes a track arm pivotally hinged to the back of the toilet seat. The track arm is configured to follow a track coupled internal to a base enclosure of the toilet as the lifting mechanism raises the toilet seat.

The track arm has a radius of curvature such that as the toilet seat raises and pivots, the track arm guides the toilet seat forward to maintain a constant virtual pivot point or substantially constant virtual pivot point between the front of the toilet seat and the front of the toilet base. Neither a constant virtual pivot point nor a substantially constant virtual pivot point is physical pivot point such as that which would be provided by a hinge, a ball and socket, or another joint between two members. Instead, the constant virtual pivot point and the substantially constant virtual pivot point pivot in the space (e.g., in the air) without the opposing members being physically coupled. For a completely constant virtual pivot point, the pivoting member remains in a constant position at the pivot point. In a substantially constant virtual pivot point, the pivoting member may move within a distance range in space. The distance range may be a predetermined radius that defines the substantially constant virtual pivot point. An example radius may be 5, 10, or 20 millimeters. The radius may any size. The distance range may be a three dimensional arc that is geometrically similar to the path of the track. The geometrically similar may be defined as having the same shape. An object or defined space may be manipulated through uniformly scaling (enlarging or reducing), and/or additional translation, rotation and reflection to arrive at another object or defined space that is geometrically similar.

In this manner, the toilet assembly can limit the range of motion of the toilet seat, while still allowing a user to go from a standing position to a sitting position, or from a sitting position to a standing position. In addition, the disclosed toilet assembly has an improved aesthetic design, as compared to conventional toilets that include external lifting mechanisms, since the lifting mechanism of the present disclosure is disposed within the toilet base and is substantially concealed from view when the toilet seat assembly is in a lowered position.

Figure 2:
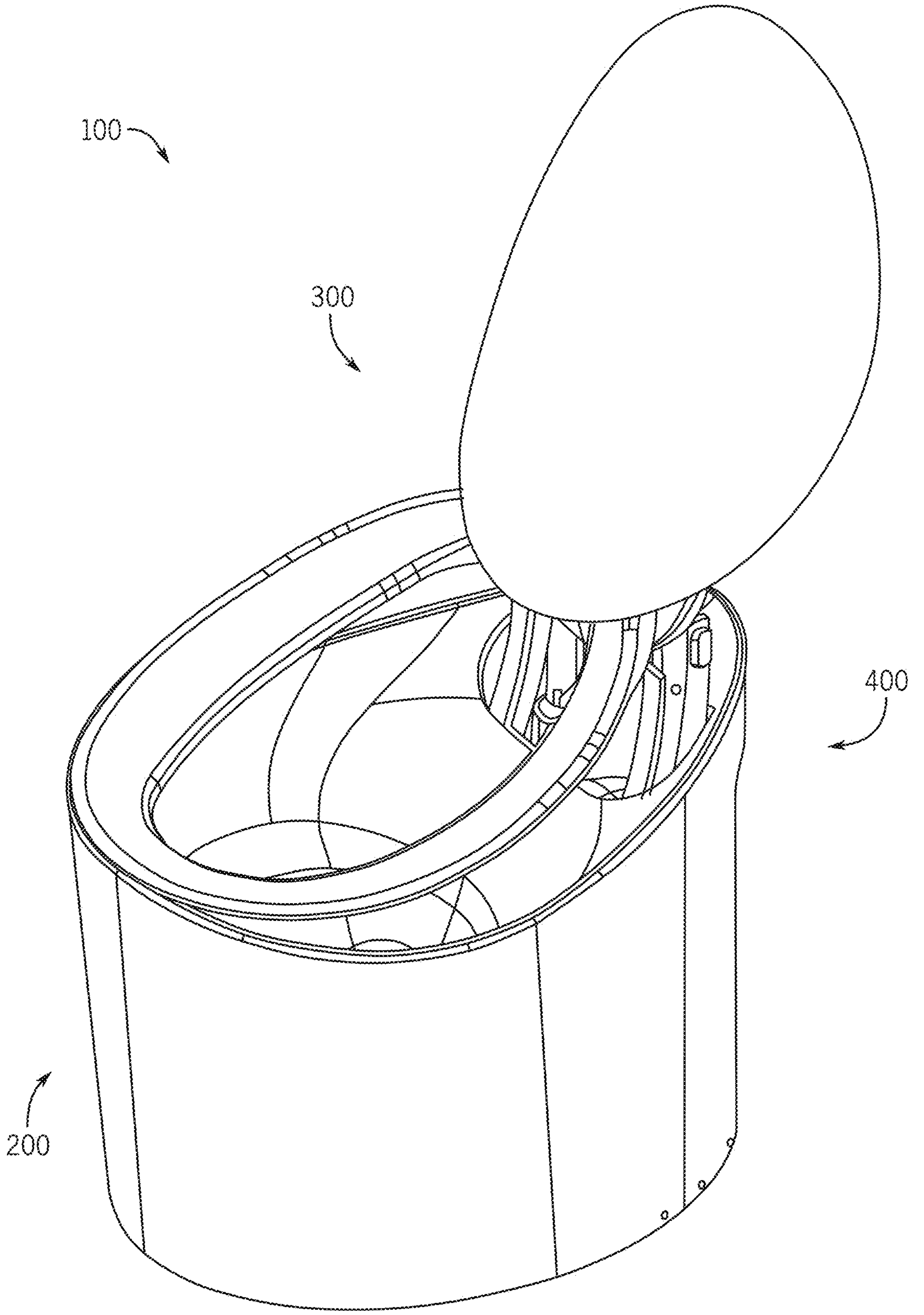
FIG. 2 is another perspective view of the toilet assembly of FIG. 1 according to an exemplary embodiment.

Referring to FIGS. 1 and 2, a toilet assembly 100 is shown according to an exemplary embodiment. The toilet assembly 100 includes a base assembly 200, a toilet seat assembly 300, and a lifting assembly 400.

The base assembly 200 may include a water inlet configured to receive water from a water source (e.g., toilet tank, water line, etc.) and feed water into a toilet bowl (e.g., through a channel), to both move the contents from the bowl through an outlet structure, as well as to clean the inside surface(s) of the toilet bowl. The option toilet tank may be mounted separately and be separated from the base assembly 200.

The outlet structure may be fluidly connected to the toilet bowl to carry the water and the contents from the toilet bowl away from the toilet structure (e.g., into a drainpipe). The base assembly 200, which fluidly connects the water inlet structure to the outlet structure, includes the toilet bowl and a water channel. The bowl structure is configured to feed water into the toilet bowl from an outlet of the water channel that is located between a back portion (e.g., back wall) and a side portion (e.g., back wall) of the toilet bowl.

The toilet may optionally include one or more jets, where each jet supplies water to the toilet bowl. A jet supply hole (e.g., an inlet port) may fluidly connect and supply water to a jet (e.g., a jet orifice) through a fluid conduit, channel or other feature. Each jet can be located in a sump of the toilet bowl (e.g., front, rear and/or side location in the sump) or elsewhere in the bowl (e.g., above the sump). If the toilet includes a jet, the toilet can include a vent hole that allows air in the system (e.g., jet channel) to be directed to the rim channel (rather than being blown out of the jet orifice). The water inlet structure is configurable to receive water from a water source, such as a water tank. Specifically, the water source (e.g., a tank) can provide water to the inlet channel through an opening of the rim. The inlet channel may be fluidly connected to the water channel and the jet supply hole at a forward end of the inlet channel. Thus, for the illustrated toilet, the inlet channel supplies water to the water channel and the jet supply hole upon activation of a flush cycle. The jet supplies water to the bowl to be evacuated through the outlet structure (e.g., the trapway) upon a flush activation to assist in the flush cycle. Upon an activation of a flush cycle, water enters and flows forward through the inlet channel, where a forward wall may divert a first flow of water into the water channel to enter the toilet bowl and a second flow of water to the jet supply hole.

In some conventional toilets, the toilet covers and seats are typically hingably attached to a portion of a toilet base, such that a user can raise the front of each of the cover and the seat from a closed or lowered position to an open or stowed position. The cover and the seat each pivot about a horizontal axis between the lowered position and the stowed position. However, it is often difficult to maintain both the cleanliness of the toilet, particularly at the hinge location, and the overall look and aesthetics of the toilet with this traditional configuration and movement.

Accordingly, as shown in the exemplary embodiments, the toilet includes a cover and seat opening mechanism that allows both a cover and a seat to be automatically and/or manually moved relative to the toilet and to maintain the cleanliness (in particular during use) of the toilet.

In order to allow the cover and the seat to move between the lowered position and the stowed position, the opening mechanism may include a ball-and-socket hinge between the cover and the base. The ball-and-socket joint allows the cover and the seat to each pivot and rotate (or swivel) about two different axes.

Figure 3:
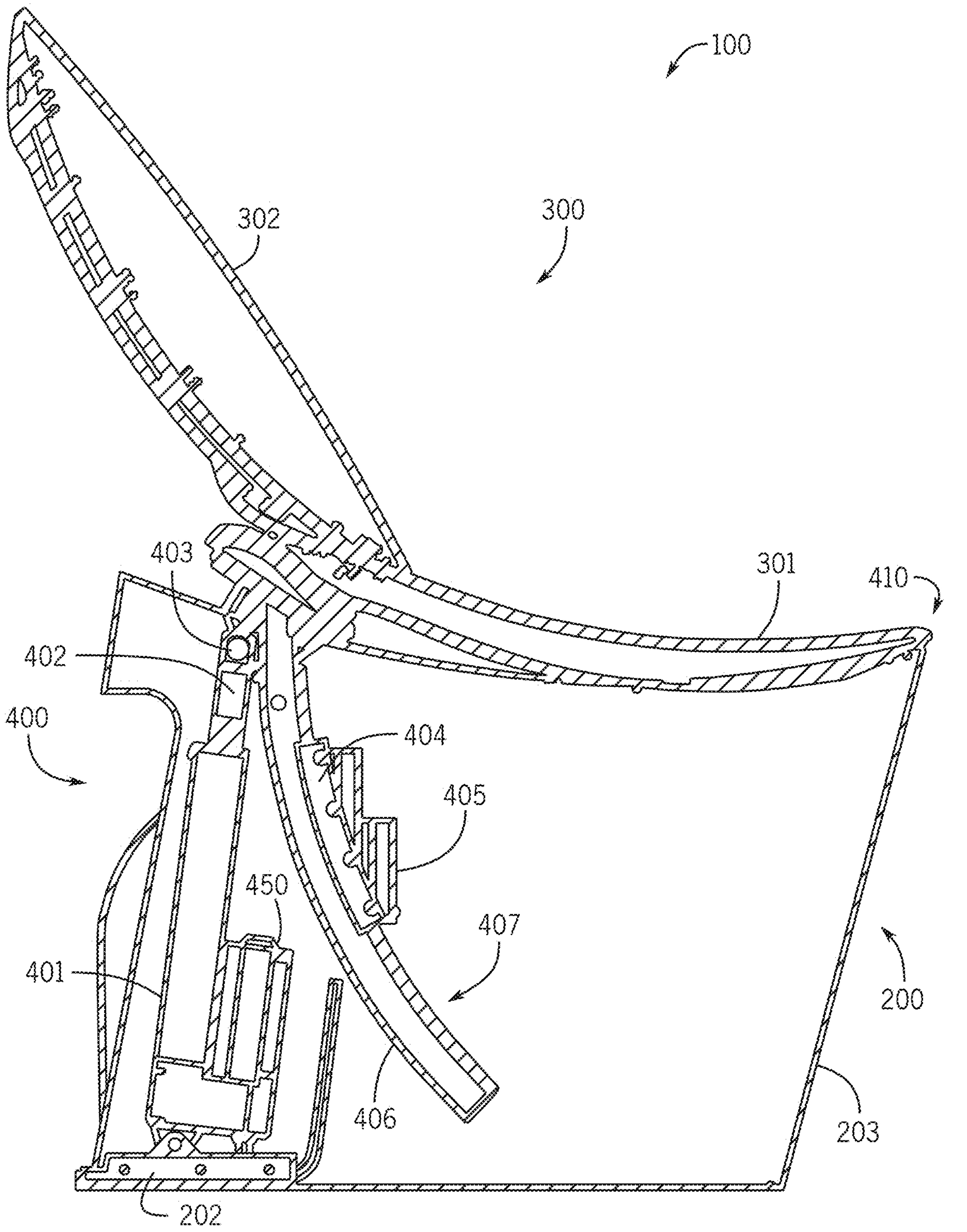
FIG. 3 is a partial cross-sectional side view of the toilet assembly of FIG. 1.
Figure 4:
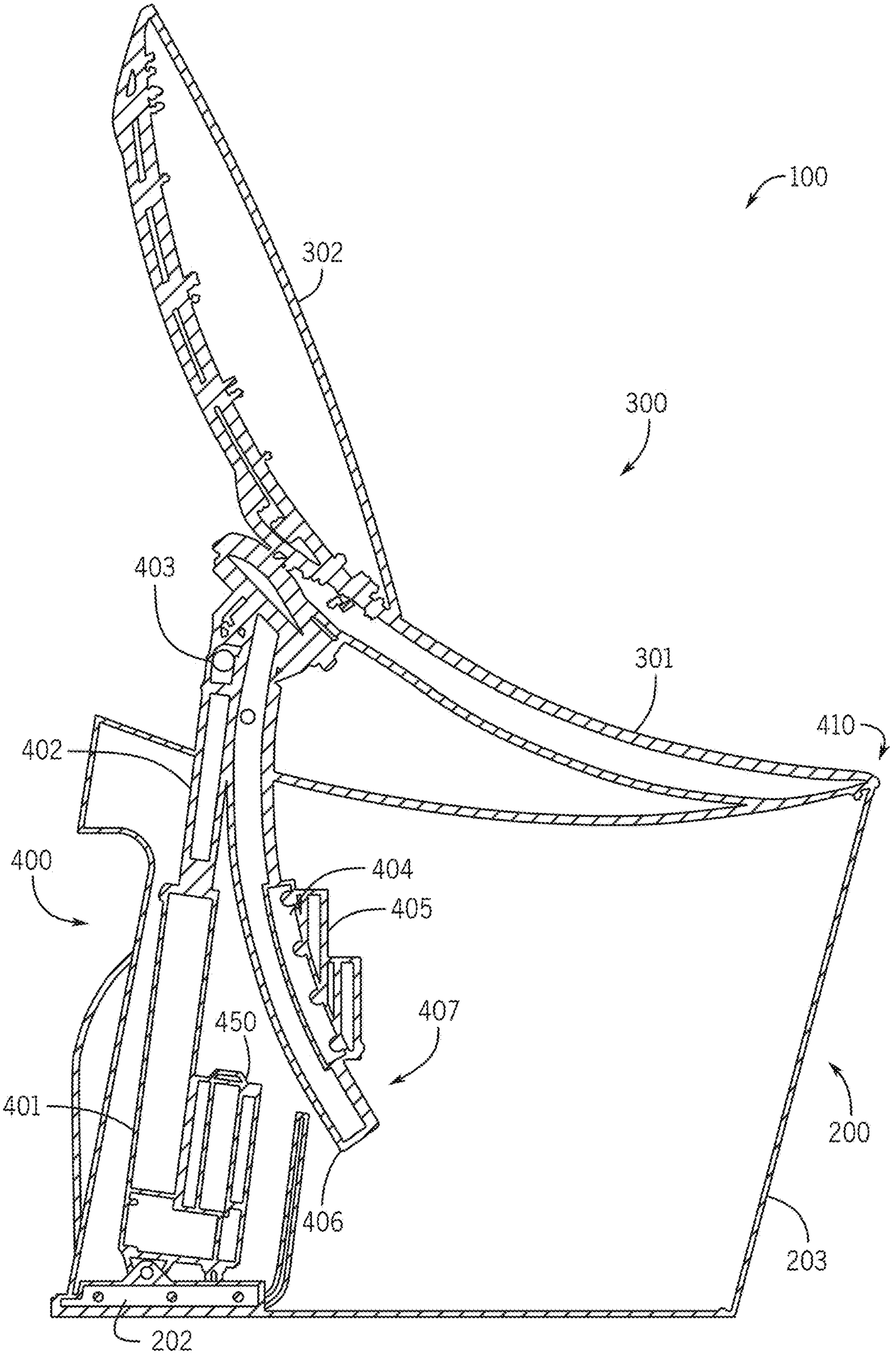
FIG. 4 is a partial cross-sectional side view of the toilet assembly of FIG. 2.
Figure 6:
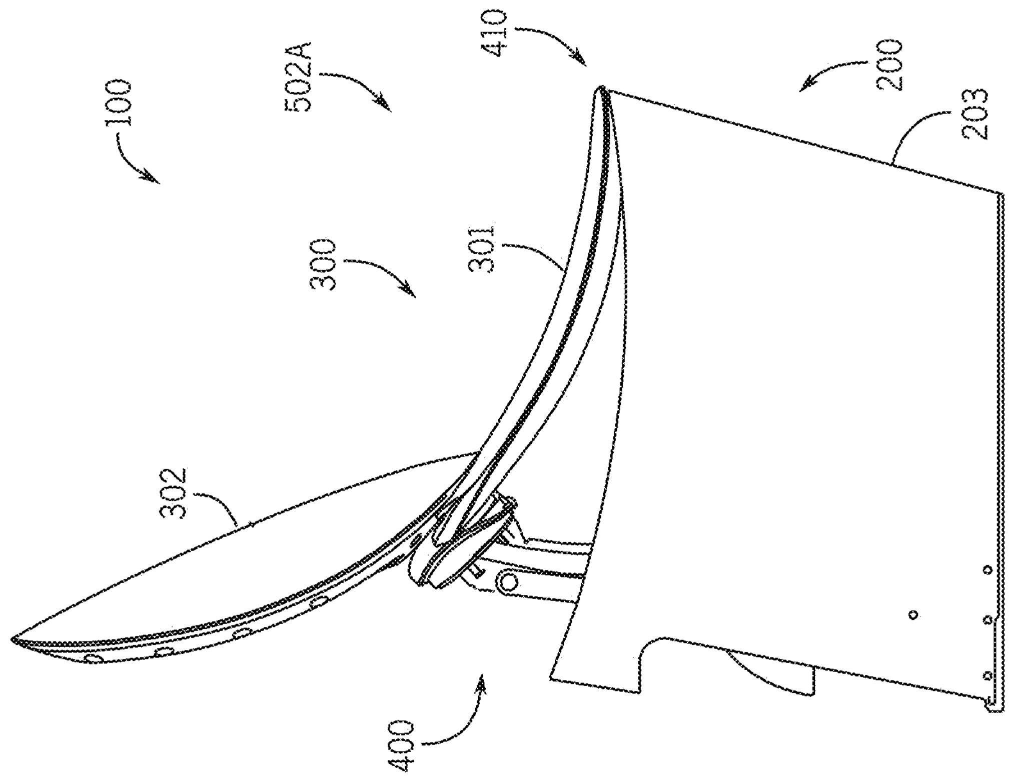
FIG. 6 is a side view of the toilet assembly of FIG. 2.
Figure 5:
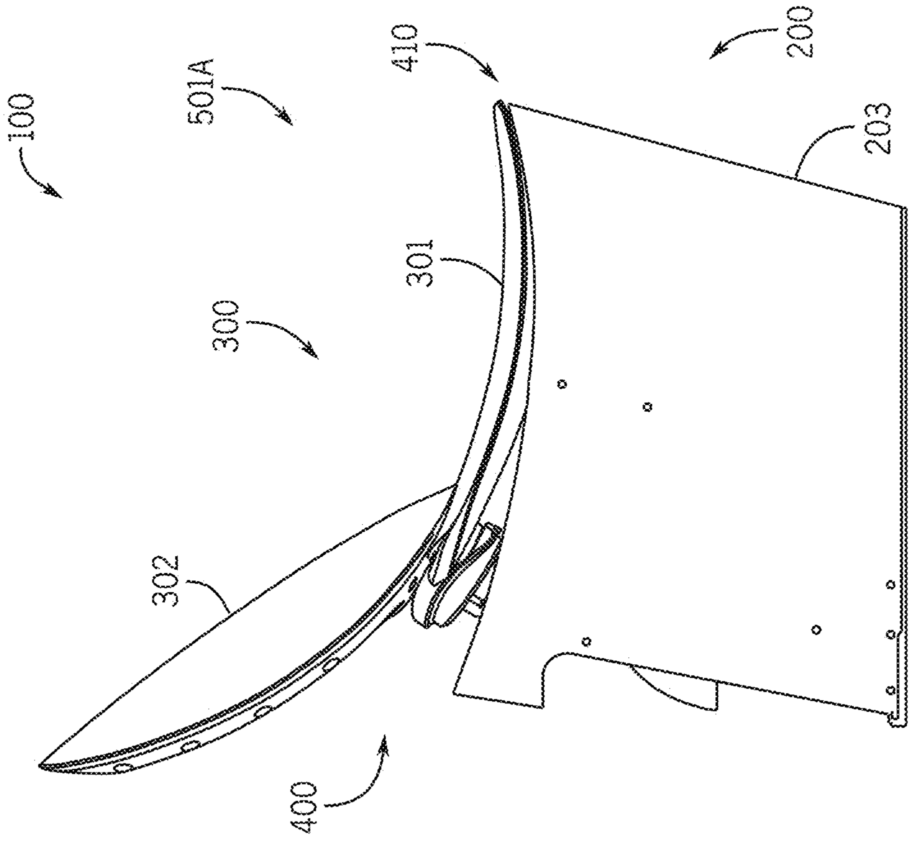
FIG. 5 is a side view of the toilet assembly of FIG. 2.
Figure 7:
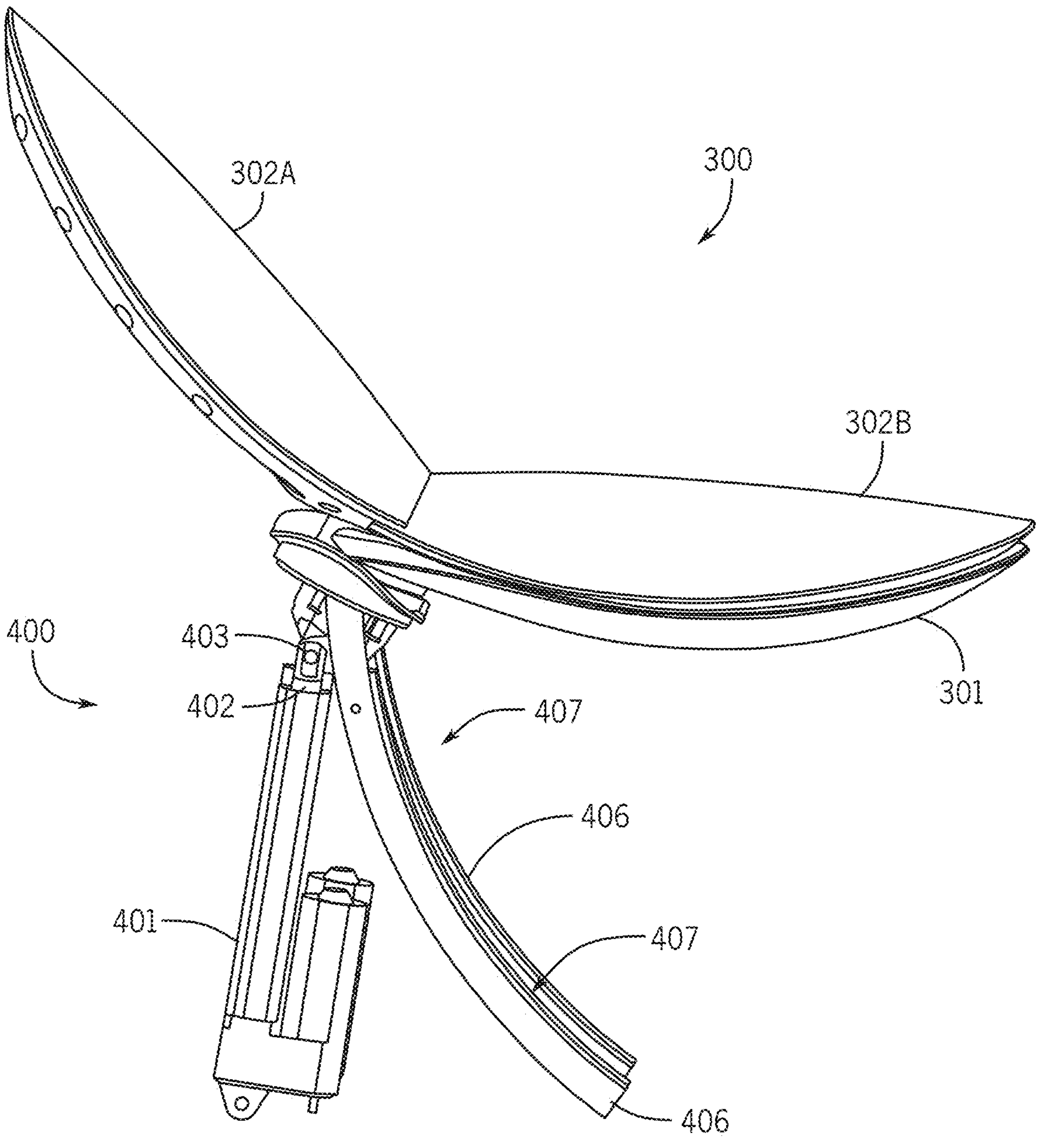
FIG. 7 is a side view of the toilet assembly of FIG. 1 according to an exemplary embodiment.

Referring to FIGS. 3 and 4, according to an exemplary embodiment, the base assembly 200 includes a bowl within the interior of the base assembly 200, a base support 202, and a base enclosure 203. The base support 202 may be coupled to a mounting bracket or a plumbing fixture (e.g., floor mounted toilet flange or wall mounted toilet flange). The base assembly 200 may be referred to as the base, pedestal, etc.

The toilet seat assembly 300 includes a seat 301 configured to support a person, and a lid 302 coupled to the seat 301. The lid 302 may be substantially similar to the cover system described in International Publication No. WO 2019/199925, the entire disclosure of which is hereby incorporated by reference herein. In some exemplary embodiments, the toilet seat assembly 300 further comprises a pair of side rails bordering the toilet assembly 100 on opposing sides. The side rails may assist a user by allowing the user to grasp the side rails for stabilization. In some embodiments, the side rails are configured to be selectively raised or lowered between a storage position and a support position. In the storage position the side rails are in a lowered position, below the seat 301. The side rails may retract into the base assembly 200 while in the storage position. In the support position, the side rails are positioned above the seat 301, and configured to support at least a portion of the weight of a user.

The lifting assembly 400 includes an actuator 401 (e.g., hydraulic actuator, a pneumatic actuator, an electric actuator, etc.) including an extension rod 402 wherein the actuator 401 is configured to extend the extension rod 402. The actuator 401 may include a housing or sleeve that the extension rod 402 may slide into, partially or completely. The actuator 401 may be connected to a source 450. The source 450 may vary according to any of the following examples.

A hydraulic actuator may use hydraulic power (e.g., a cylinder, a fluid-based motor, etc.) to linearly extend or retract the extension rod 402 relative to the actuator 401. In this example, the source 450 may include a cylinder, a hydraulic pump, a reservoir, and at least one valve. The reservoir stores a hydraulic liquid. The hydraulic pump moves the fluid in the reservoir using pressure. Example pumps include gear pumps, piston pumps, and vane pumps. The one or more valves start and stop the system and direct the fluid from the reservoir to the cylinder. The hydraulic actuator includes a chamber that receives the hydraulic energy through a flow of hydraulic fluid and changes it to mechanical energy by moving the extension rod 402 as the chamber fills with fluid and pushes extension rod. The fluid may be water, a petroleum based fluid or a synthetic based fluid.

A pneumatic actuator may use pressurized gas to linearly extend or retract the extension rod 402 relative to the actuator 401. The pneumatic actuator may include a piston in a cylinder that moves the load of the extension rod 402 in the linear path. In the case of the pneumatic actuator, the source 450 may include a pressured air tank, air compressor, or other source of pressurized air.

An electric actuator may use electrical energy (e.g., an electric motor) to linearly extend or retract the extension rod 402 relative to the actuator 401. In this example, the source 450 may include a battery or utility source of electrical power that causes the electric motor to turn. The extension rod 402 may be threaded and/or the actuator 401 may be threaded. The output shaft of the electric motor is coupled directly to the extension rod 402 or the actuator 401 or indirectly, through a drive train coupled to the extension rod 402 or the actuator 401. The electric motor may cause the extension rod 402 to rotate relative to the actuator 401 to extend the extension rod 402.

The actuator 401 may be another actuator type that is configured to linearly extend or retract extension rod 402. In some embodiments, the lifting assembly 400 includes a plurality of actuators 401. The lifting assembly 400 may include any combination of actuator types (e.g., a hydraulic actuator and a pneumatic actuator, etc.)

The actuator 401 is configured to couple to the base support 202 of the base assembly 200. In some embodiments, the base assembly 200 defines a cavity configured to receive the actuator 401. In other embodiments, the actuator 401 is coupled directly to a surface that the toilet assembly 100 is positioned on (e.g., a floor or pedestal).

The extension rod 402 is pivotally coupled to a track arm 406, and the track arm 406 is coupled to the toilet seat assembly 300. The track arm 406 includes a contour 407 defining a radius of curvature. The example radius of curvature may be larger than the height of the toilet. The radius of curvature of the track arm 406 may be equivalent to, or within a predetermined range such as plus or minus 20% of that of the seat 301. Such a radius of curvature may minimize any deviation in the virtual pivot point of the seat 301.

A track 404 is coupled to the base assembly 200 by a track support 405. The track 404 may follow the same radius of curvature illustrated as contour 407. Thus, the track 404 may also have a radius of curvature equivalent to, or within a predetermined range such as plus or minus 20% of that of the seat 301.

In some embodiments, the track support 405 includes a plurality of track supports 405. The track arm 406 is slidably coupled to the track 404. As the actuator 401 extends the extension rod 402, the track arm 406 is pulled upwards, and is configured to freely pivot about an extension pivot point 403 (e.g., hole and shaft). The track arm 406 slides upward relative to the track 404. The contour 407 of the track arm 406 causes the top of the track arm 406 to extend forward as the track arm 406 is raised by the extension rod 402, and pivot relative to the extension rod 402. As the track arm 406 raises relative to the track 404, the toilet seat assembly 300 pivots. The radius of curvature of the contour 407 of the track arm 406 is such that as the toilet seat assembly 300 raises and pivots, the top of the track arm 406 extends and allows the front end of the seat 301 of the toilet seat assembly 300 to maintain a constant virtual pivot point 410 at the front of the base assembly 200. In some alternative embodiments, the toilet assembly 100 includes a pair of lifting assemblies 400.

Referring generally to FIGS. 1-7, the lifting assembly 400 is configured to move the toilet assembly 100 from a first toilet seat position 501A to a second toilet seat position 502A. According to an exemplary embodiment, the first toilet seat position 501A is a lowered sitting position, and the second toilet seat position 502A is a raised standing position. When the toilet assembly 100 is in the first toilet seat position 501A, the extension rod 402 is retracted, the track arm 406 is in a lowered position, and the toilet seat 301 is oriented substantially horizontally. When the toilet assembly 100 is in the second toilet seat position 502A, the extension rod 402 is fully extended, the track arm 406 is in an extended position, and the toilet seat 301 is at an angle such that the lid 302 of the toilet seat assembly 300 is substantially vertical. In other embodiments, the lifting assembly 400 may be configured to have one or more intermediate positions between the two toilet seat positions, 501A and 502A.

The toilet assembly 100 may also include a rotation device (e.g., rotation motor or drive train) to rotate the seat 301, the lid 302, or both the seat 301 and the lid 302 are configured to rotate about an axis (e.g., a vertical axis or an axis at an angle with the vertical). The rotation device may be integrated with the lifting assembly 300 or independent of the lifting assembly 300. For example, the rotation device and the lifting assembly may be integrated in that they both use the same electric motor. The rotation device may rotate the seat 301 and the lid 302 independently from a stowed position (e.g., pointed substantially up) to a lowered position (e.g., substantially parallel with the rim of the toilet). While the lid 302 is in the stowed position and the seat 301 is in the lowered position, the inside of the base assembly 200 or bowl is exposed, and the user may therefore use the toilet. While the lid 302 is in the stowed position (regardless of the position of the seat 301), the back portion of the lid 302 obscures or covers the portion of the opening mechanism. By substantially obscuring the opening mechanism, the toilet also has a more streamlined and clean look with an "invisible hinge" because a user cannot see the opening mechanism from the front end of the base assembly.

Figure 8:
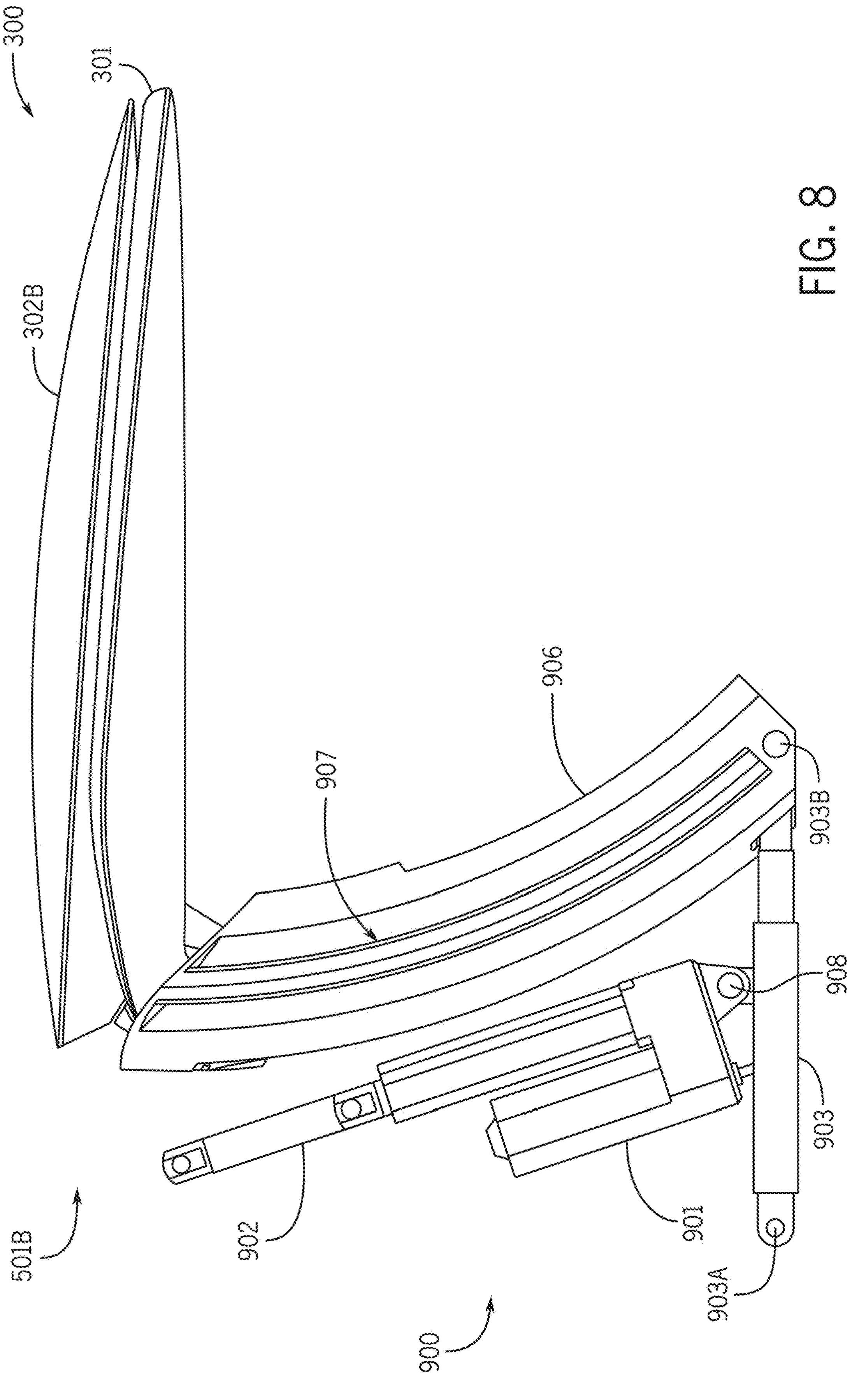
FIG. 8 is a side view of a toilet assembly of FIG. 1 according to an exemplary embodiment.
Figure 9:
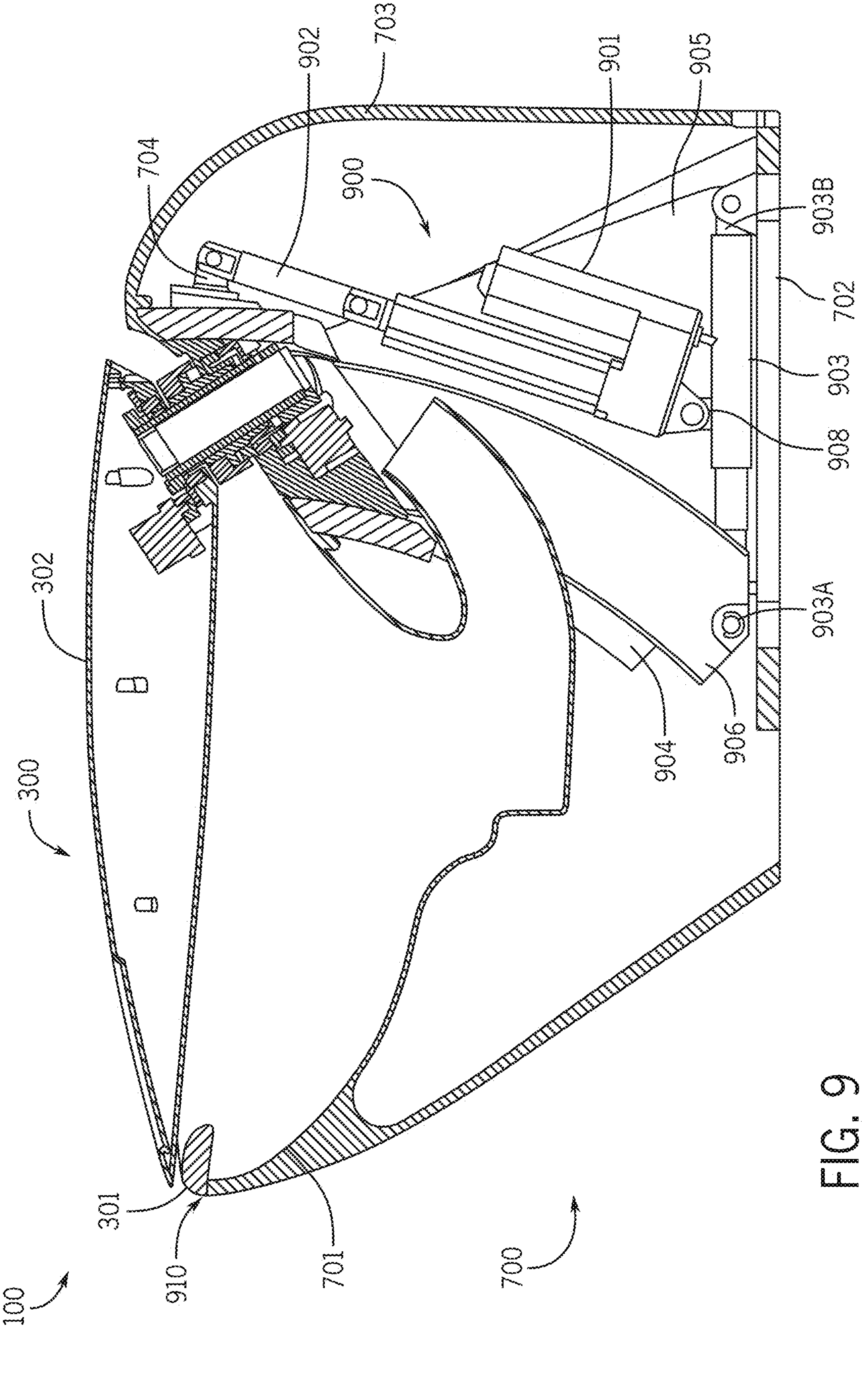
FIG. 9 is a cross-sectional side view of the toilet assembly of FIG. 8.
Figure 10:
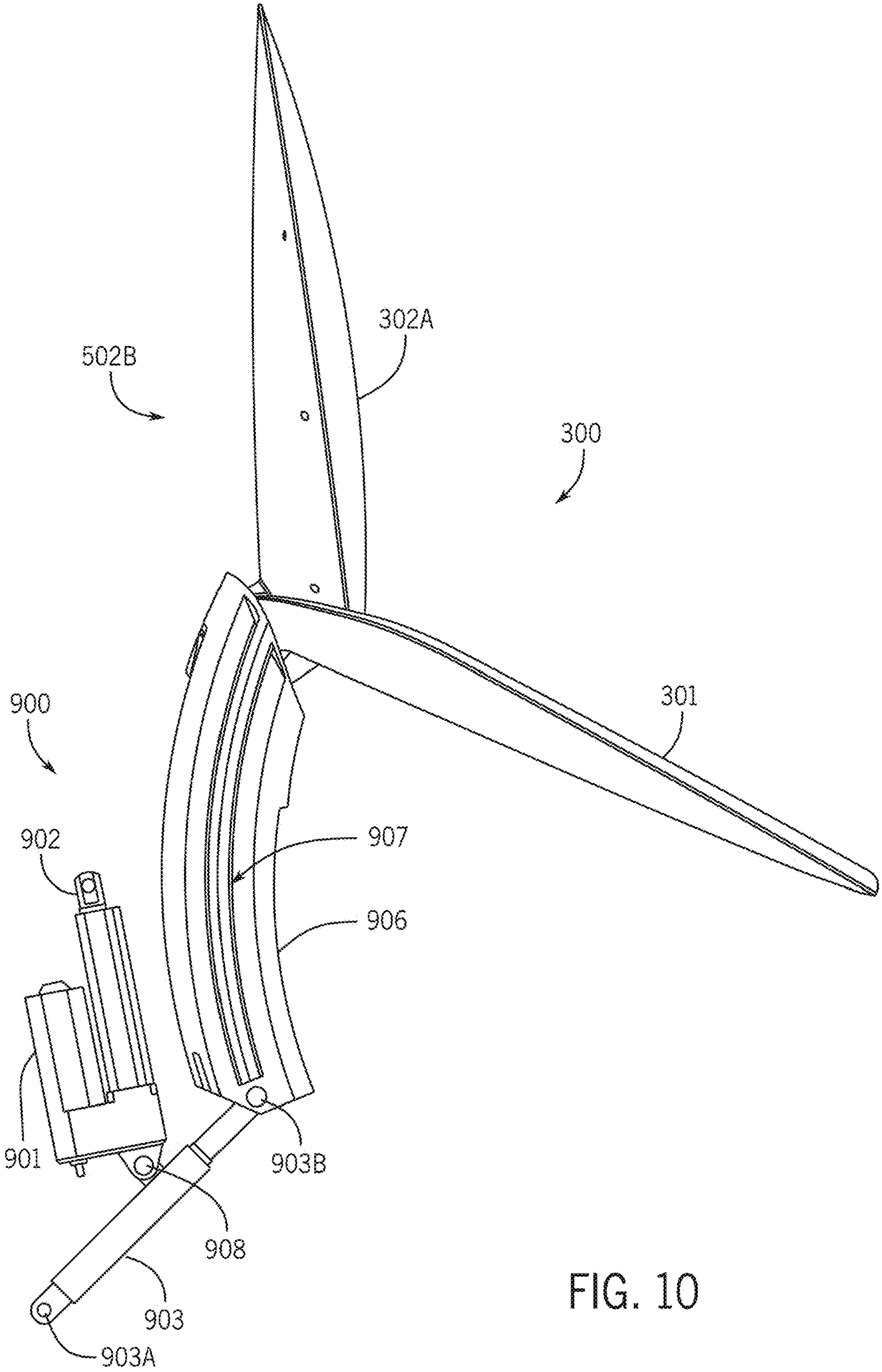
FIG. 10 is a side view of a toilet assembly of FIG. 1 according to an exemplary embodiment.

Referring to FIGS. 8-10, according to another exemplary embodiment, the toilet assembly 100 includes a base assembly 700 including a bowl 701 (e.g. base, pedestal, etc.), a base support 702, a base enclosure 703 configured to surround the base assembly, and a pivot support 704.

The lifting assembly 900 further includes an actuator 901 (e.g., hydraulic actuator, a pneumatic actuator, an electric actuator, etc.) including an extension rod 902 wherein the actuator 901 is configured to extend the extension rod 902. The lifting assembly 900 further includes a pivot rod 903 with a first end 903A, a second end 903B, and a connector 908. The lifting assembly 900 further includes a track 904 having a track support 905, and a track arm 906 having a contour 907 that defines a radius of curvature. The extension rod 902 is pivotally coupled to the first pivot support 704 of the base assembly 700. The actuator 901 is pivotally coupled to the connector 908 of the pivot rod 903. The pivot rod 903 is pivotally coupled to the base support 702 of the base assembly 700 on a first end 903A and the pivot rod 903 is pivotally coupled to the track arm 906 on a second end 903B. The track arm 906 is slidably coupled to the track 904. The track 904 is fixedly coupled to the base assembly 700 by the track support 905.

The track arm 906 is slidably coupled to the track 904. The lifting assembly 900 is configured to move the toilet seat assembly 300 from a first toilet position 501B to a second toilet position 502B. According to one exemplary embodiment, the first toilet position 501B is a lowered sitting position, and the second toilet position 502B is a raised standing position. As shown in FIG. 8, when the toilet assembly 100 is in the first toilet position 501B, the extension rod 902 is extended, the pivot arm 903 is substantially horizontal, the track arm 906 is in a lowered position, and the toilet seat 301 is substantially horizontal. As shown in FIG. 10, when the toilet assembly 100 is in the second toilet position 502B, the extension rod 902 is retracted, the pivot rod 903 is rotated such that the second end 903B is above the first end 903A, the track arm 906 is in a raised position, and the toilet seat assembly 300 is at an angle such that the lid 302 is substantially vertical. In other embodiments, the lifting assembly 400 may be configured to have more or fewer positions than the two toilet positions, 501A and 502A.

As the actuator 901 retracts the extension rod 902, the actuator 901 raises and pulls the connector 908 and the pivot rod 903 upwards. The pivot rod 903 pivots about the second end 903B. The first end 903A raises and pivots relative to the track arm 906 and moves the track arm 906 upwards relative to the track 904. The contour 907 of the track arm 906 causes the top of the track arm 906 to extend forward as the track arm 906 is raised. As the track arm 906 raises relative to the track 904, the toilet seat assembly 300 pivots. The radius of curvature of the contour 907 of the track arm 906 is such that as the toilet seat assembly 300 raises and pivots, the top of the track arm 906 extends and allows the front end of the seat 301 of the toilet seat assembly 300 to maintain a constant virtual pivot point 910 at the front of the base assembly 700. In some embodiments, the components of the lifting assembly 900 (e.g., actuator 901, extension rod 902, track arm 906, etc.) are substantially similar the components of the lifting assembly 400 (e.g., actuator 401, extension rod 402, track arm 406, etc.). Any of the components of the lifting Referring to FIGS. 7-10, according to an exemplary embodiment, the seat assembly 300 is configured to allow the lid 302 to selectively move between a first lid position 302A and a second lid position 302B. The first lid position 302A is configured to support at least a part of the weight of a user while the toilet seat assembly 100 selectively moves between the first toilet position 501A or 501B and the second toilet position 502A or 502B. When the lid 302 is in the second lid position 302B, the lid 302 is configured to cover the toilet seat 301. The lid 302 is pivotable between the first lid position 302A and the second lid position 302B. In some embodiments, the toilet seat assembly 300 can be selectively moved between the first lid position 302A and the second lid position 302B manually by the user. In some embodiments, the toilet seat assembly 300 can be selectively moved between the first lid position 302A and the second lid position 302B by a motor (e.g., an electric motor).

Figure 11:
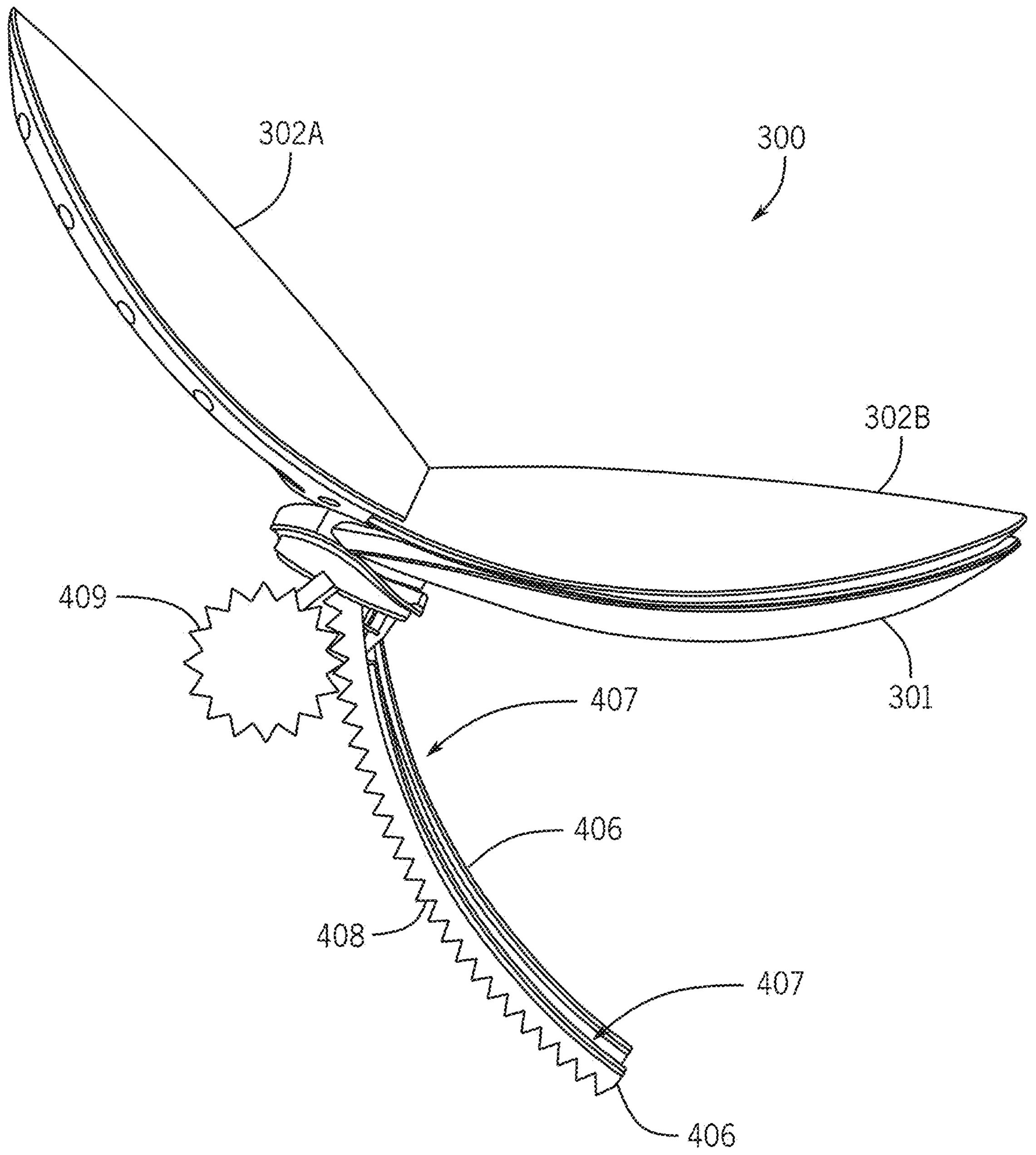
FIG. 11 is a side view of a toilet assembly of FIG. 1 according to an exemplary embodiment.

Referring to FIG. 11, according to an exemplary embodiment, the lifting assembly 400 includes an arcuate rack 408 coupled to the track arm 406 configured to mesh with a gear 409. The gear 409 can be selectively rotated to drive the arcuate rack 408. The gear 409 may be rotated by an actuator (e.g. an electric motor). For example, as the gear 409 rotates in a first rotational direction (e.g. counterclockwise), the gear 409 meshes with the arcuate rack 408 causing the track arm 406 to move in an upward direction. As the gear 409 rotates in a second rotational direction, opposite to the first rotational direction (e.g. clockwise), the gear 409 meshes with the arcuate rack 408 causing the track arm 406 to move in a downward direction. The rotation of the gear 409 can move the toilet seat assembly 300 between a plurality of positions. For example, the rotation of the gear 409 may move the toilet seat assembly 300 between the first toilet seat position 501A and the second toilet seat position 502A. In other embodiments, the rotation of the gear 409 may move the toilet seat assembly between one or more intermediate positions between the first toilet seat position 501A and the second toilet seat position 502A. In other exemplary embodiments, the lifting assembly 900 may include an arcuate rack substantially similar to the arcuate rack 408 and a gear substantially similar to the gear 409.

Figure 12:
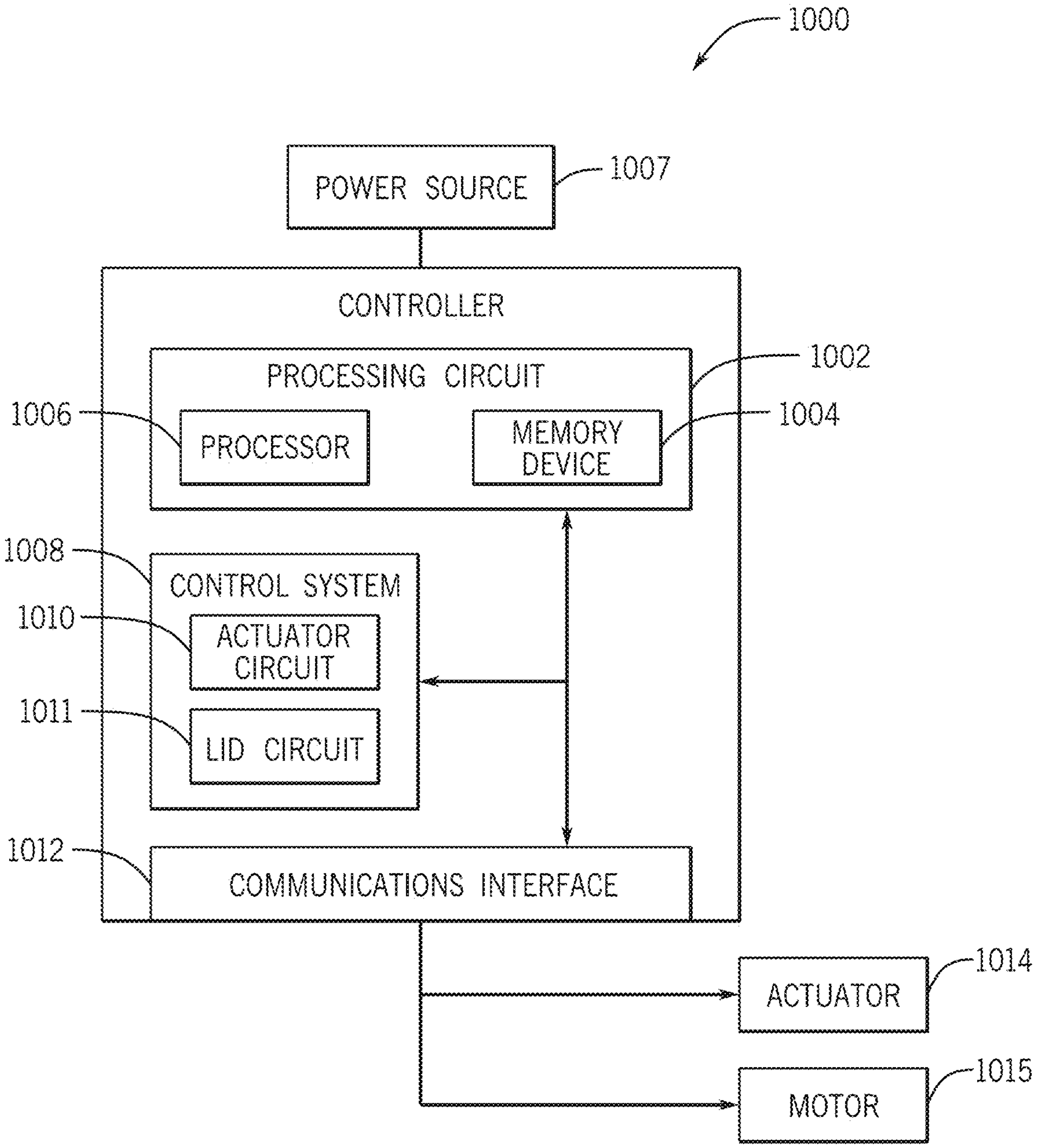
FIG. 12 is a schematic view of a control system of the toilets of FIGS. 1-10 according to an exemplary embodiment.

Referring to FIG. 12, according to an exemplary embodiment, a controller 1000 is communicably coupled to the toilet assembly 100. The controller 1000 includes a processing circuit 1002 that is cooperatively defined by a processor 1004 and a memory device 1006. In the various embodiments described herein, the processor 1004 may be implemented as a general-purpose processor, an application specific integrated circuit (ASIC), one or more field programmable gate arrays (FPGAs), a digital-signal-processor (DSP), a group of processing components, or other suitable electronic processing components. Memory device 1006 is one or more devices (e.g., RAM, ROM, Flash Memory, hard disk storage, etc.) for storing data and/or computer code for facilitating the various processes described herein. In other embodiments, memory device 1006 may be a portable storage device such as an SD card, a micro SD card, or other similar type of portable storage device. Memory device 1006 may be or include non-transient volatile memory or non-volatile memory. Memory device 1006 may include database components, object code components, script components, or any other type of information structure for supporting the various activities and information structures described herein. Memory device 1006 may be communicably connected to processor 1004 and provide computer code or instructions to processor 1004 for executing the processes described herein. The processing circuit 1002 may be operatively coupled to the Internet to enable, for example, over-the-air software updates for various components of the toilet assembly 100 downloading diagnostic information, use information, or the like. The controller 1000 is powered by a power source 1007. According to an exemplary embodiment, the power source 1007 is a battery that is coupled to the toilet assembly, such as in the base assembly 200, 700 or in the lid 302.

According to an exemplary embodiment, the power source 1007 is located remotely from the toilet assembly 100.

The controller 1000 further includes communications interface 1012 that can allow for electronic communication (e.g., Wi-Fi, Bluetooth, ZigBee, infrared light, etc.) between the toilet assembly 100 and a communication device. In some embodiments, the communication device is a mobile communication device, such as a smartphone, a tablet, a laptop, etc. so as to enable the remote control and programming of various functions of the toilet assembly 100. In other embodiments, the communication device is an electronic display incorporated in the toilet assembly 100 so as to enable the remote control and programming of various functions of the toilet assembly 100. The communication interface 1012 may also allow for electronic communication between the toilet assembly and a plurality of communication devices simultaneously. The communications interface 1012 may also be configured to provide various feedback signals to a user, such as audible, visual, or other types of signals to indicate various states, functions, or conditions of the toilet assembly 100 (e.g., the current toilet seat position of the toilet assembly 100). In addition, the communications interface 1012 may include a microphone or a similar device coupled to the toilet assembly 100 to allow a user to use voice commands to control various functions of the toilet assembly 100.

The processing circuit 1002 is also operatively coupled to the control system 1008 including, for example, an actuator circuit 1010 to enable to operation of the actuator 1014. For example, the user can selectively operate the actuator 1014 between a plurality of positions, such as between the first toilet seat position 501A, 501B and the second toilet seat position 502A, 502B. In some embodiments, the actuator 1014 is replaced by actuator 401 or 901. The control system 1008 may include a lid circuit 1011 to enable to operation of a motor 1015. For example, the user can selectively operate the motor 1015 between a plurality of positions, such as between the first lid position 302A and the second lid position 302B. A user may send a control signal via a software application available on a mobile communication device or from an electronic display incorporated in the toilet assembly 100 to the processing circuit 1002 via the communications interface 1012, so as to remotely control the movement of the actuator 1014 and/or the motor 1015. A control signal can be sent from the processing circuit 1002 to, for example, actuator 1014 to control the movement of the actuator 1014. The controller 1000 allows for selective and independent control of movement of actuator 1014 and motor 1015. It should be understood that the controller 1000 may include additional circuits and components in a similar manner described above.

As described further herein, the toilet may be positioned along, attached to, or mounted to a floor. However, according to another embodiment, the toilet 20 may be wall-hung or mounted on a wall 12 such that the entire toilet 20 is completely separated and spaced apart from the floor 10 (i.e., the toilet 20 does not contact the floor 10). The back end 44 of the base 30 of the toilet 20 may be attached to the wall 12. It should be appreciated that the toilet 20' may be similarly configured to be wall-hung or mounted on the wall 12 in a similar manner, according to another exemplary embodiment.

Additionally, the various components of the toilet 20 may be used together or separately. Furthermore, various components of the toilet 20 may be add-on or replacement components on a conventional toilet. For example, the lifting mechanism may be added onto a conventional toilet after market. Optionally, the toilet may include a quick release ring to allow the user to easily remove the whole seat and/or cover for easy cleaning. Furthermore, the various sources of liquid within the toilet may have automatic shut-off valves that automatically close the liquid passageway when a portion of the toilet (e.g., the seat) is removed to prevent liquid from leaking out.

Figure 13:
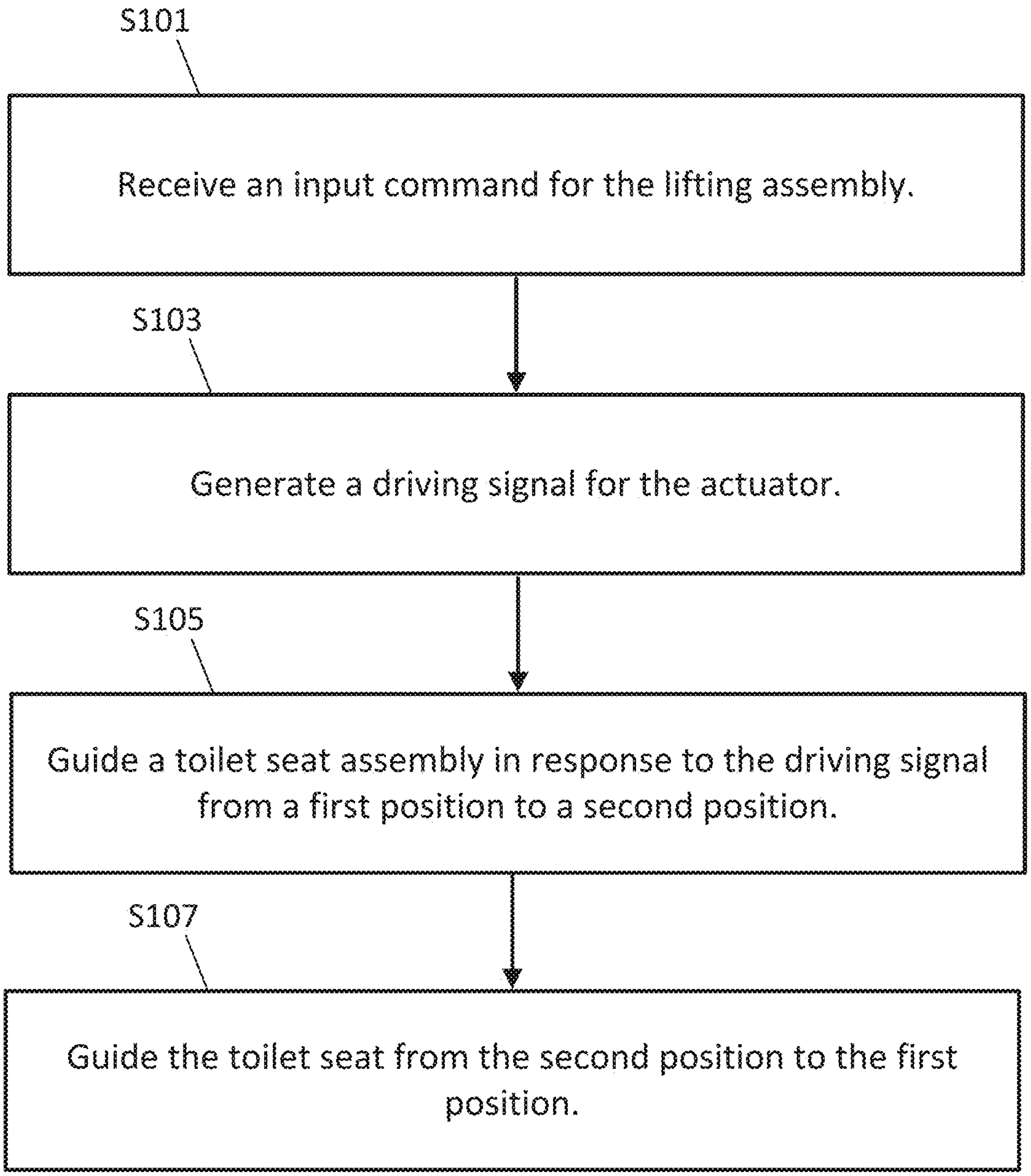
FIG. 13 is a flow chart for the operation of the control system of FIG. 12.

FIG. 13 illustrates a flow chart for the operation of controller 1000. The acts of the flow chart may be performed by any combination of the controller 1000 and/or the lifting assembly 300. Portions of one or more acts may be performed by another device. Additional, different of fewer acts may be included.

At act S101, the controller 1000 (e.g., through processor 1004) receives an input. The input may be an input command received from a user. For example, an input device such as a button, switch, or lever may be operated by the user to generate the input command. In another example, the input may be based on information collected by a sensor. The sensor may determine the present of the user or a hand gesture made by the user. The sensor may be a motion detector that detects movement of the user and generates the input command. The sensor may be a pressure sensor or weight sensor that senses when the user begins or attempts to stand from the seat 301.

At act S103, the controller 1000 (e.g., through processor 1004) generates a driving signal for an actuator of the lifting assembly. The driving signal may turn on a motor that moves the actuator rod. The driving signal may open a valve for air pressure to move the actuator rod. The driving signal may open a valve for hydraulic fluid to move the actuator rod.

The driving signal may be sent to an actuator circuit 1010 to enable to operation of the actuator 1014. The actuator circuit 1010 may include a relay that drives the electric motor. The actuator circuit 1010 may include control logic for selection of different heights for the toilet seat assembly. The heights may be selected by the user or set at the factor. The height may be based on the height of the user or the abilities of the user. One or more other input devices such as a knob or dip switches may be used to set the different heights or preferred height.

The driving signal may be sent to the lid circuit 1011. The lid circuit may drive motor 1015 to rotate the lid between a plurality of positions. The input from the user may include a lid command to cause rotation of the lid from a closed position to an open position and vice versa. The lid circuit 1011 may in addition or alternatively be configured to rotate the toilet seat. Thus, the input from the user may include a seat command to cause rotation of the toilet seat from a lowered position to an up position.

At act S105, the controller 1000, by way of the driving signal, or the actuator, under instruction from the driving signal, guides the toilet seat assembly from a first position to a second position. The path of the toilet seat assembly may have a radius of curvature to limit the range of motion of the toilet seat assembly. The track path may allow the rear potion of the toilet seat assembly to be lifted vertically, or at a predetermined angle with the vertical direction, while the vertical or horizontal displacement of the front portion of the toilet seat is minimized. In some examples, the front portion of the toilet seat assembly does not move position but merely pivots. In some examples, the front portion of the toilet seat assembly moves only a predetermined amount.

At S107, the controller 1000, by way of the driving signal, or the actuator, under instruction from the driving signal, guides the toilet seat assembly from a first position to a second position. Alternatively, act S107 may be performed under the force of gravity and not the driving signal.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the [apparatus, system, assembly, etc.] as shown in the various exemplary embodiments is illustrative only.

Additionally, any element disclosed in one embodiment may be incorporated or utilized with any other embodiment disclosed herein. For example, the lifting assembly 400 of the exemplary embodiment may be incorporated in the lifting assembly 900 of the exemplary embodiment.

Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A toilet comprising:

a toilet seat assembly configured to pivot about a pivot point between a raised position and a lowered position, wherein the pivot point is substantially at a front of the toilet seat assembly;

a toilet base including a toilet bowl;

a lifting mechanism disposed within the toilet base such that the lifting mechanism is concealed when the toilet seat assembly is in the lowered position; and a pivot rod pivotably supported by the toilet base on a first end of the pivot rod and coupled to a track arm on a second end of the pivot rod.

2. The toilet of claim 1, further comprising:
a track arm configured to guide the toilet seat assembly between the raised position and the lowered position.
3. The toilet of claim 2, further comprising:
an extension rod pivotally coupled to the track arm.
4. The toilet of claim 3, further comprising:
an actuator configured to extend and retract the extension rod to guide the toilet seat assembly between the raised position and the lowered position.
5. The toilet of claim 4, wherein the actuator is configured to use hydraulic liquid to extend or retract the extension rod.
6. The toilet of claim 4, wherein the actuator is configured to use pressurized gas to extend or retract the extension rod.
7. The toilet of claim 4, wherein the actuator is configured to use electrical energy to extend or retract the extension rod.
8. The toilet of claim 1, further comprising:
a control system configured to receive an input to the toilet seat assembly from the raised position to the lowered position.
9. The toilet of claim 1, further comprising:
a track having a radius of curvature to limit a range of motion of the toilet seat assembly between the raised position and the lowered position.
10. The toilet of claim 1, wherein a front portion of the toilet seat assembly is not coupled to the toilet base.
11. The toilet of claim 1, wherein the lowered position of the toilet seat assembly corresponds to a sitting position for a user and the raised position of the toilet seat assembly corresponds to a standing position.
12. A toilet comprising:
a toilet seat assembly configured to pivot about a pivot point between a raised position and a lowered position, wherein the pivot point is substantially at a front of the toilet seat assembly;
a toilet base including a toilet bowl;
a lifting mechanism disposed within the toilet base such that the lifting mechanism is concealed when the toilet seat assembly is in the lowered position; and
an arcuate rack driven by a gear to extend and retract an extension rod to guide the toilet seat assembly between the raised position and the lowered position.
13. An apparatus comprising:
a toilet seat assembly configured to pivot about a pivot point between a raised position and a lowered position, wherein the pivot point is substantially at a front of the toilet seat assembly;
a lifting mechanism disposed within a toilet base including a bowl such that the lifting mechanism is concealed when the toilet seat assembly is in the lowered position; and
a pivot rod pivotably supported by a toilet base on a first end of the pivot rod and coupled to a track arm on a second end of the pivot rod.
14. The apparatus of claim 13, further comprising:
an extension rod pivotally coupled to the track arm.
15. The apparatus of claim 14, further comprising:
an actuator configured to extend and retract the extension rod to guide the toilet seat assembly between the raised position and the lowered position.
16. The apparatus of claim 15, wherein the actuator is configured to use hydraulic liquid to extend or retract the extension rod.
17. The apparatus of claim 15, wherein the actuator is configured to use pressurized gas to extend or retract the extension rod.
18. The apparatus of claim 15, wherein the actuator is configured to use electrical energy to extend or retract the extension rod.

* * * * *